UNITED STATES PATENT OFFICE.

KATSUICHI ITO, OF NISHI KU, OSAKA, JAPAN.

PROCESS OF PREPARING LICORICE-ROOT EXTRACT.

1,389,663.  Specification of Letters Patent.  Patented Sept. 6, 1921.

No Drawing.  Application filed April 5, 1920.  Serial No. 371,260.

*To all whom it may concern:*

Be it known that I, KATSUICHI ITO, subject of Japan, residing at No. 33 Satsuma-Bori Kita-no-Machi, Nishi Ku, Osaka, Japan, have invented new and useful Improvements in a Process of Preparing Licorice-Root Extract, of which the following is a specification.

This invention relates to a process of preparing licorice root extract, and consists in beating small pieces of licorice roots in a beater, separating by decoction the soluble substance from the fiber, boiling the decoction thus obtained, adding thereto an acid, until all the glycyrrhizic acid contained therein precipitates, being freed from all impurities, and neutralizing the precipitates thus obtained with an alkali. The object of this invention is to obtain by a simple and economic process comparatively a larger yield of pure licorice root extract, containing no fermenting sugars and free of any offensive odor, and at the same time to turn the remaining fiber into account by using the same as material for manufacturing pulp.

The following is an example of carrying my invention into practice:

Take licorice roots cut to pieces 1 to 3 inches long, and beat them in a beating machine, such as is used in pulp manufacture but provided with a heating means, add thereto a suitable quantity of hot water, until the fibers become separated and all the soluble ingredients extracted. After removing the fibrous residue by filtration or decantation, acidulate the remaining liquor by adding thereto a suitable amount of sulfuric acid and boil it for a while, thus hydrolyzing fermentable sugars and matters giving out odors and then allow it to cool until all the glycyrrhizic acid coagulates to the hardness of resin. Break the coagulated glycyrrhizic acid and neutralize it with alkali carbonate. The substance is then again dissolved by heating, and the transparent liquor obtained by filtering the same is concentrated. The fibrous residue obtained as a by-product can be used as material for pulp manufacture.

Thus according to my invention, as chopped licorice roots are decocted while being beaten in a beating machine, soluble substances are thoroughly extracted therefrom using only a small amount of fuel. Moreover, when, in order to precipitate glycyrrhizic acid, the fermentable sugars and matters which give out offensive odor are hydrolyzed by boiling the liquid in the presence of an acid, a comparatively purer product can be obtained using a less amount of acid. Further, as the licorice roots are well beaten while being decocted, the tough fibers can be obtained ready for use for the manufacture of pulp.

To sum up, my invention has the following advantages:—

1. Much fuel and time are saved while obtaining a large yield of comparatively purer glycyrrhizate.

2. It turns the residue which has hitherto been thrown away, into a superior material for the manufacture of pulp.

I claim:

1. A process of preparing licorice root extract characterized by allowing a decoction of licorice root to stand for a while after adding thereto an acid, decanting therefrom supernatant clear solution, boiling the clear solution in the presence of an acid until the dissolved matters coagulate to the hardness of resin, and neutralizing the same by an alkali carbonate; substantially as and for the purposes hereinbefore set forth.

2. A process of preparing licorice root extract characterized by allowing a decoction of licorice root to stand for a while after adding thereto an acid, decanting therefrom supernatant clear solution, boiling the solution in the presence of an acid, thereby hydrolyzing fermentable sugars and odor giving matters, until the dissolved matters coagulate to the hardness of resin, breaking the coagulated substance into pieces, and neutralizing the same with an alkali carbonate, substantially as and for the purposes hereinbefore set forth.

3. The process of preparing licorice root extract which consists in beating said root and adding hot water thereto, separating the fibrous material from the liquid, adding sulfuric acid to said liquid and boiling the same, allowing the liquid to cool thereby to coagulate glycyrrhizic acid therefrom, neutralizing said acid with an alkali carbonate, heating the mass to dissolve the same, and filtering the resulting solution.

In testimony whereof I have signed my name to this specification.

KATSUICHI ITO.